Patented Sept. 8, 1953

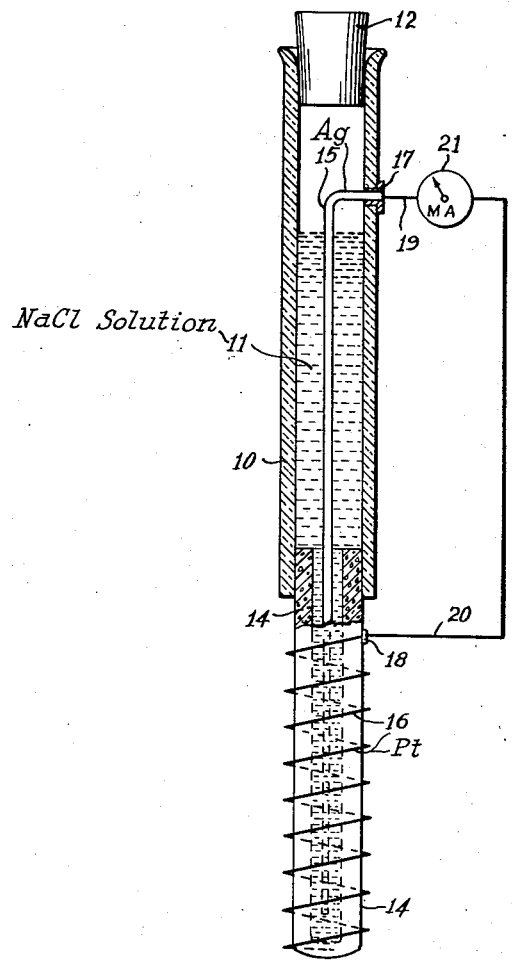

2,651,612

UNITED STATES PATENT OFFICE 2,651,612

AMPEROMETRIC ANALYZER

John F. Haller, Niagara Falls, N. Y., assignor to Mathieson Chemical Corporation, a corporation of Virginia Application February 4, 1948, Serial No. 6,189

3 Claims. (Cl. 204—195)

My invention concerns amperometry and more particularly pertains to an amperometric device suitable for determining the concentration of an oxidizing or reducing gas in a gaseous mixture comprising such a gas. The device is especially valuable as applied in the analysis of gas mixtures containing chlorine either as such or in the form of chlorine dioxide.

The need has long existed for a device of the character indicated which is suitable for continuous operation and which can be adapted to provide continuous automatic indication and recording. While many amperometric devices have been proposed for use in the analysis of aqueous solutions of oxidizing gases, chlorine water, for example, these in the main are grossly inaccurate when applied in the analysis of gaseous mixture.

The device herein is of simple construction and, accordingly, can be produced in quantity and at a reasonable cost. Although it will doubtless be considered a valuable laboratory tool, I consider it chiefly significant as a means of process control. Thus, it may be applied in the manufacture of chlorine dioxide, as by generation from acidified chlorate solutions with reducing gases, to insure safe dilution of the product gas with inert gas. An interesting and related application of the device is disclosed in the copending patent application of Gordon D. Byrkit, Serial No. 787,573, filed November 22, 1947 (now abandoned), which describes and claims a novel method of air-conditioning and a novel system of air-conditioning apparatus. The device is also highly useful as a warning device in the manufacture of hydrazine, for example by the method described in copending application Serial No. 784,809, filed November 8, 1947. It may be placed in strategic positions in the plant and through a relay may actuate a suitable signal when the concentration of hydrazine in the air exceeds a critical value. Sulfur dioxide and nitrogen peroxide are exemplary of gases other than chlorine which may be detected or measured with the device.

I shall describe my invention with the aid of the accompanying drawing, a sectional elevation, illustrating a preferred embodiment thereof.

In the drawing, numeral 10 denotes a tube constructed of a material, as glass, impermeable with respect to an electrolyte solution 11, which may be a saturated solution of sodium or potassium chloride, for example. Tube 11 is closed at its upper end by a stopper 12, a rubber stopper being normally used. Tubular section 14, which with the tube 10 forms a receptacle for the reservoir of electrolyte solution, is constructed of a material, as porous clay, permeable with respect to the solution.

A silver electrode 15 is immersed in the electrolyte solution, while a platinum wire electrode 16 is wound about the porous tubular section 14. Terminals 17 and 18 are provided for connecting leads 19 and 20, respectively, the circuit being completed through a microammeter 21. The latter is illustrated diagrammatically since, of itself, it forms no part of the invention herein. The different potentials between the electrodes and their respective solutions causes a current to flow therebetween without the necessity of impressing an external source of current.

Although, as indicated, I prefer silver as the reference electrode, a gold, lead or graphite electrode may be used with a suitable electrolyte. Lithium sulfate solution, saturated at room temperature, is recommended with a lead electrode. Less costly metals than platinum, nickel, for example, may be used for the external electrode when it is known that the metal is not deleteriously affected by any of the gases with which it will come into contact. The external electrode must have the form of a wire rather than a ribbon, i. e. it should be substantially round or at least elliptical in cross section and it must be so wound about the porous surface that there is no contact between individual coils. For best results the diameter of the wire should not substantially exceed 0.05 inch. In the preferred construction the wire has a diameter of from .003 to .02 inch and is so wound that the spacing between the coils is substantially uniform.

In use, the device is enclosed within a gas-tight chamber, not shown, into which is led the gas mixture containing the gas, the concentration of which it is desired to determine. The electrolyte solution bleeds through the porous tubular section with the result that a film of solution is at all times maintained on the outside of the porous section in contact with the platinum electrode. When the gas mixture comes into contact with the film of electrolyte, the oxidizing or reducing gas dissolves reversibly therein and an equilibrium concentration is quickly established which determines the current through the microammeter.

It may be considered desirable in some applications to conserve electrolyte solution by using a porous tubular section having a porosity somewhat less than that indicated. In such case, if the rate of flow of solution through the porous tube is insufficient to maintain the external solution film, the electrode may be externally washed with water or a suitable solution at a low rate sufficient only to maintain the solution film and avoid crystallization.

The electrolyte solution surrounding the internal electrode should be kept at substantially constant concentration. A saturated solution of sodium chloride is preferred as the electrolyte because of the limited solubility of sodium chloride and because its solubility changes little with changing temperatures. Other salts may, however, be used, either in the form of saturated solutions or solutions of lesser concentration. It is only necessary that the electrolyte does not chemically attack either of the electrodes and that the negative ions of the electrolyte form a slightly soluble salt with the internal reference electrode. Generally, chlorides are preferred with a silver or mercury electrode, sulfates with a lead electrode. In some cases aqueous solutions of acids or alkalies may be used as the electrolyte.

Variations in temperature have little effect on the operation of the device and may be permitted provided proper precautions are taken to maintain constant electrolyte concentration. Using the preferred sodium chloride, a constant concentration of the electrolyte in contact with the reference electrode is most conveniently maintained at room temperature.

When external washing of the electrode is necessary I generally utilize an aqueous solution of a buffering electrolyte, e. g. sodium bicarbonate in an effective concentration, usually 2–10%. In the application of my device to the detection of hydrazine vapors in the presence of ammonia, it is desirable to wash the electrode externally with a 2–10% solution of sodium hydroxide. This prevents the solution of ammonia but does not interfere with the effect of hydrazine in causing a current to flow through the circuit.

*Example I*

The device shown in the drawing was suspended in a 2-liter beaker of air. The inner electrode was silver, the outer platinum. The inner electrode was supplied with sodium chloride solution saturated at room temperature. The contents of a 400 ml. beaker containing a chlorine dioxide-air mixture of about 35 mm. partial pressure of the former was partially decanted into the larger beaker. The ammeter promptly showed a current of 15 microamperes.

*Example II*

After flushing the 2-liter beaker used in Example I with a flow of air, 100 ml. of chlorine water freshly prepared at 18° C. was poured into the bottom of the beaker. The ammeter indicated increasing amounts of chlorine in the gaseous phase in which the electrode was suspended, up to a maximum of 18 microamperes.

*Example III*

The electrode was suspended in air in a clean 2-liter beaker and supplied as before with saturated sodium chloride solution. The electrode was also externally washed by dropping thereon continuously a 5% sodium hydroxide solution. The vapors from a bottle of 98% hydrazine hydrate were decanted into the beaker and a current of 20 microamperes was indicated.

In each of the foregoing examples, before my analyzer was exposed to an atmosphere containing oxidizing vapors, but after the sodium chloride electrolyte solution had been added, the instrument was allowed to come to equilibrium in air, as indicated by a low constant reading of the microammeter. When such equilibrium was obtained, the indicating needle was re-set to give a zero reading.

I claim:

1. An instrument for detecting and measuring concentrations of oxidizing and reducing gases in gaseous mixtures which comprises an elongated hollow receptacle confining a reservoir of electrolyte, a transverse portion of which hollow receptacle is permeable with respect to the electrolyte, an electrode disposed within the hollow receptacle spaced from the inner walls thereof extending within the permeable portion of the receptacle and surrounded by the reservoir of electrolyte, a second electrode having the form of a wire wound in spaced turns about the outer surface of the permeable portion of the receptacle, and an ammeter directly connected between the two electrodes completing an electrical circuit through the electrodes and electrolyte having no external source of electrical energy.

2. An instrument according to claim 1 in which the elongated hollow receptacle is tubular, the electrode within the receptacle is a silver electrode, and the second electrode is platinum wire having a diameter not exceeding .05 inch.

3. An instrument according to claim 1 in which the elongated hollow receptacle is tubular, the electrolyte is sodium chloride solution, the electrode within the receptacle is a silver electrode, and the second electrode is platinum wire having a diameter between about .003 and .02 inch.

JOHN F. HALLER.

References Cited in the file of this patent

UNITED STATES PATENTS

| Number | Name | Date |
|---|---|---|
| 2,278,248 | Darrah | Mar. 31, 1942 |
| 2,464,087 | Jacobson | Mar. 8, 1949 |

OTHER REFERENCES

"The Chemical Age," May 26, 1945, pages 465, 466.

"Zeitschrift fur Analytische Chemie," vol. 89 (1932), pages 361, 362.